United States Patent [19]

Kanner et al.

[11] Patent Number: 5,114,441
[45] Date of Patent: May 19, 1992

[54] OXYGEN CONCENTRATOR SYSTEM AND VALVE STRUCTURE

[75] Inventors: Rowland W. Kanner, Guntersville; Stephen P. Lisak, Arab, both of Ala.

[73] Assignee: Ryder International Corporation, Arab, Ala.

[21] Appl. No.: 609,186

[22] Filed: Nov. 2, 1990

[51] Int. Cl.⁵ .............................................. B01D 53/04
[52] U.S. Cl. ..................................... 55/26; 55/62; 55/68; 55/179
[58] Field of Search ................ 55/25, 26, 33, 58, 62, 55/68, 74, 75, 161–163, 179, 180, 387, 389

[56] References Cited

U.S. PATENT DOCUMENTS

| | | |
|---|---|---|
| 2,237,684 | 4/1941 | Moore .............................. 55/162 X |
| 2,751,034 | 6/1956 | Ringo et al. ........................... 55/180 |
| 3,085,379 | 4/1963 | Kiyonaga et al. .................. 55/62 X |
| 3,487,608 | 1/1970 | Gräff ............................... 55/179 X |
| 4,038,054 | 7/1977 | Gräff ............................... 55/179 |
| 4,209,308 | 6/1980 | Blodgett .............................. 55/179 |
| 4,272,265 | 6/1981 | Snyder .............................. 55/179 X |
| 4,469,494 | 9/1984 | van Weenen .......................... 55/179 |
| 4,539,019 | 9/1985 | Koch ............................... 55/179 X |
| 4,636,226 | 1/1987 | Canfora ............................ 55/179 X |
| 4,673,415 | 6/1987 | Stanford ............................ 55/179 X |
| 4,787,417 | 11/1988 | Windsor, Jr. ....................... 55/179 X |
| 4,790,858 | 12/1988 | Sircar ................................ 55/26 |
| 4,869,733 | 9/1989 | Stanford ............................ 55/179 X |
| 4,913,709 | 4/1990 | Kumar ................................ 55/26 |
| 4,914,218 | 4/1990 | Kumar et al. .......................... 55/26 |
| 4,915,711 | 4/1990 | Kumar ................................ 55/26 |
| 4,925,464 | 5/1990 | Rabenau et al. ....................... 55/179 |
| 4,968,334 | 11/1990 | Hilton .............................. 55/179 |

FOREIGN PATENT DOCUMENTS

| | | |
|---|---|---|
| 0368435 | 5/1990 | European Pat. Off. ............. 55/179 |
| 2924052 | 12/1980 | Fed. Rep. of Germany ........ 55/179 |
| 3238969 | 4/1984 | Fed. Rep. of Germany ........ 55/161 |

OTHER PUBLICATIONS

Puritan-Bennett Companion 492 Oxygen Concentrator-Service Manual Diagrams, Nov. 1, 1984.
Healthdyne BX 3000 Oxygen Concentrator Diagrams, Mar. 1983.

Primary Examiner—Robert Spitzer
Attorney, Agent, or Firm—Trexler, Bushnell, Giangiorgi & Blackstone, Ltd.

[57] ABSTRACT

A valve assembly and processing system are provided in which the valve assembly enables cycled fluid flow switching and communication between a plurality of flow conduits. The valve assembly includes two valve members which have respective engaged surfaces relatively rotatable to provide the valving action. A first valve member includes at least three through apertures for respective communication with the flow conduits, and the second valve member includes a flow passage for selectively interconnecting a plurality of the apertures and enables selective interconnection of the three apertures for fluid flow among the three apertures and the respective conduits. The system can be employed, for example, to provide switching of air intake between dual air separation vessels which are operated in a cycled manner to provide concentrated oxygen product. The valve assembly then allows periodic communication between the two processing vessels so that the oxygen-rich product from one of the vessels is used to pre-charge the other processing vessel. A recycled portion of the oxygen-rich product stream is blended with air to form a feed mixture to the oxygen separation processing vessels which thereby increases the oxygen concentration in the product stream. The waste gas from the processing vessels is discharged to exhaust through a pressure transfer unit which transfers the pressure of the waste gas stream to the feed mixture stream which is compressed for intake to the processing vessels and thus increases the operating efficiencies of both the air separation process and the waste gas purging process.

9 Claims, 4 Drawing Sheets

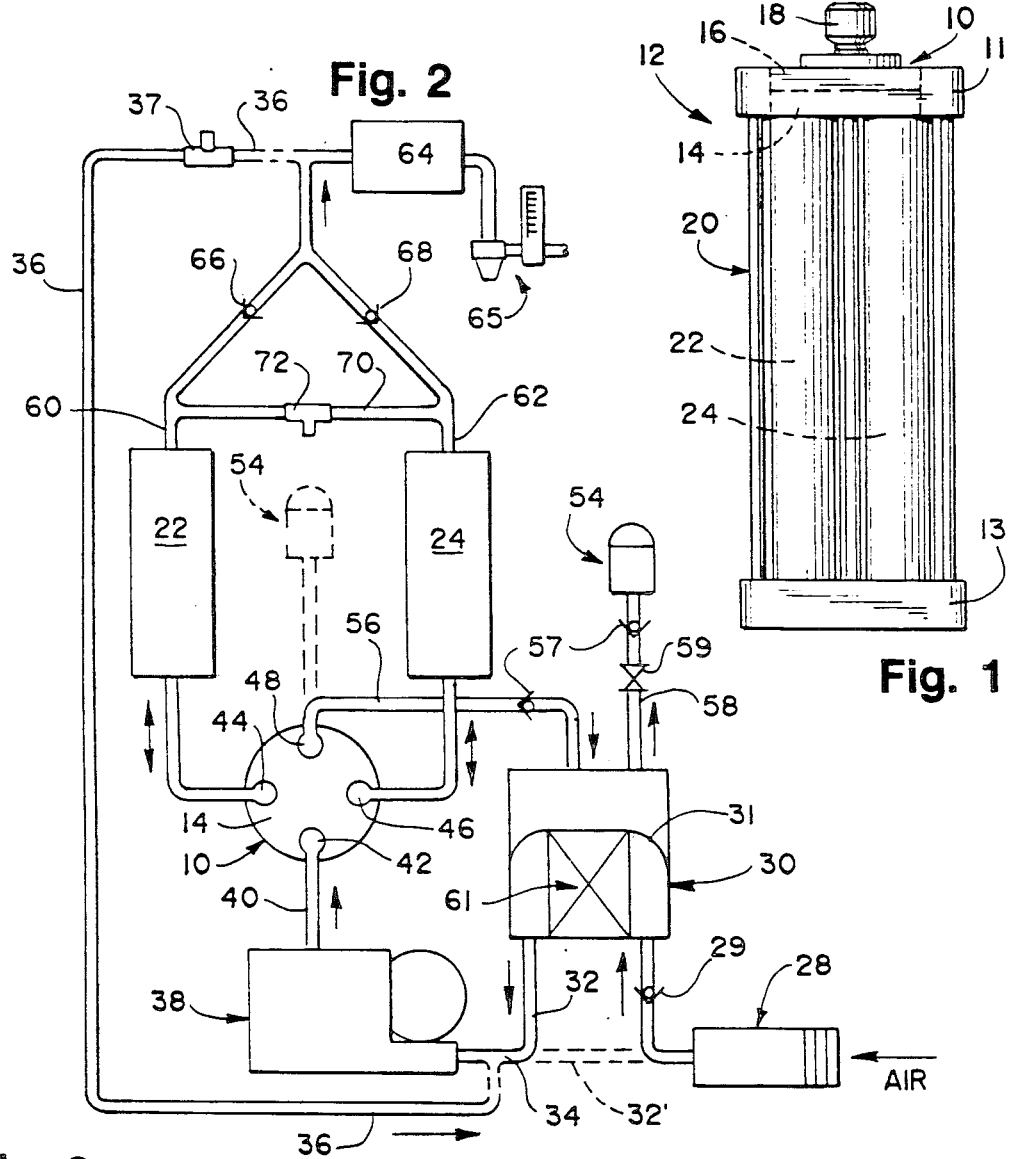
Fig. 1
Fig. 2
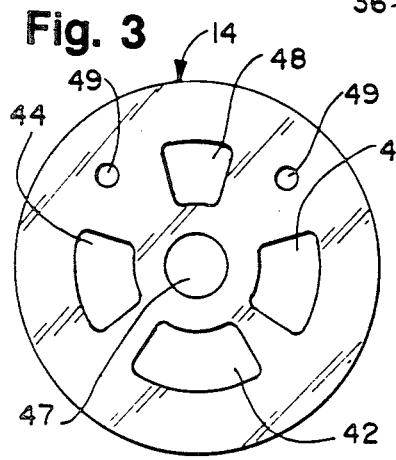
Fig. 3
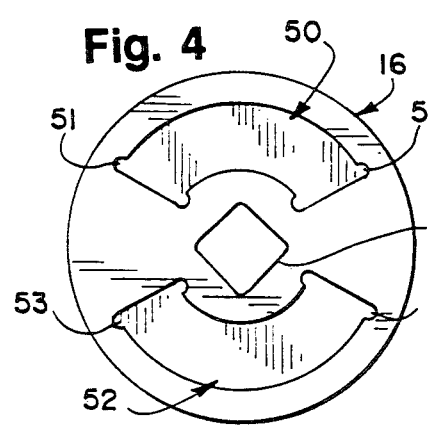
Fig. 4
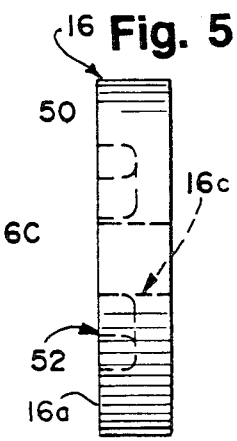
Fig. 5

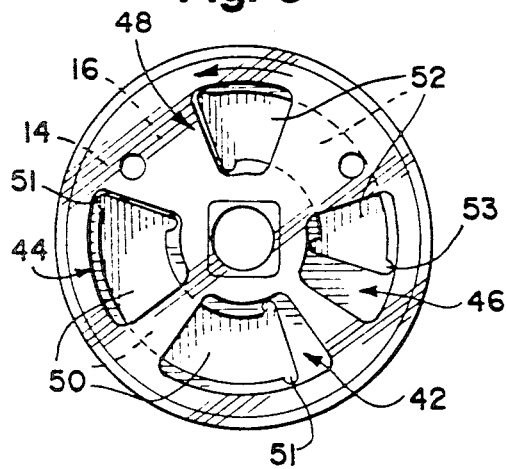
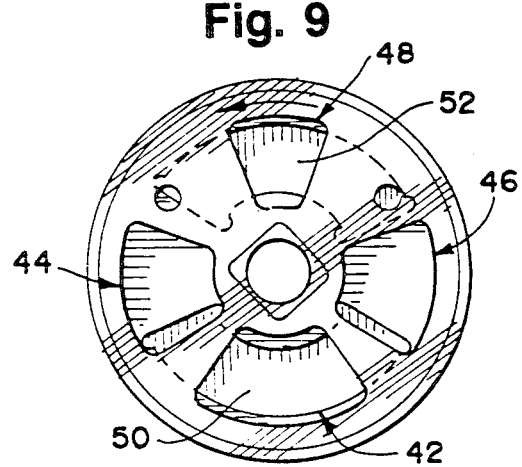
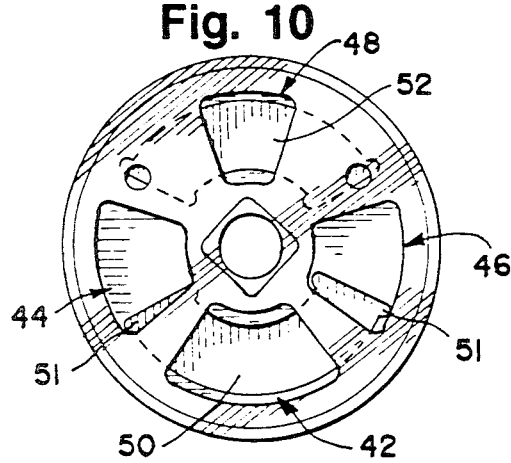
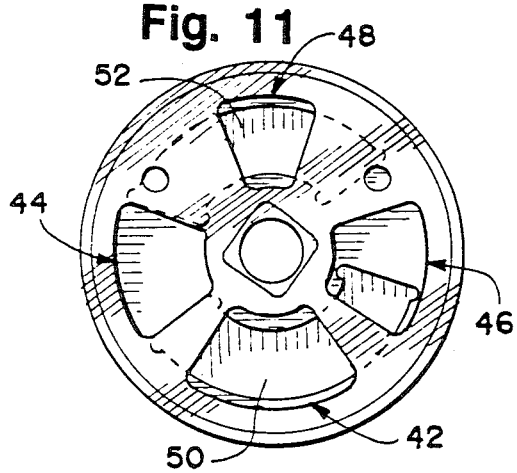
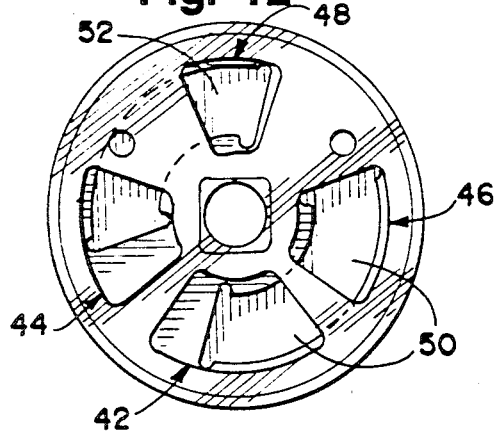
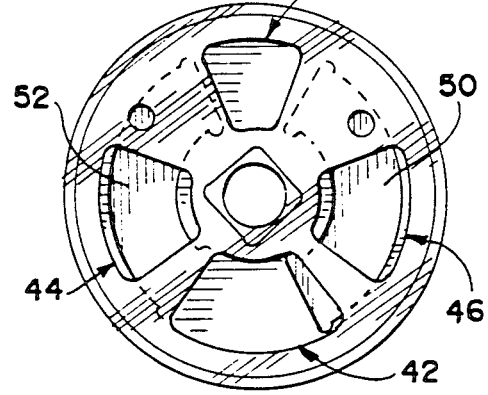

5,114,441

OXYGEN CONCENTRATOR SYSTEM AND VALVE STRUCTURE

BACKGROUND OF THE INVENTION

This invention relates to improved flow control valves for switching fluid flow among multiple flow conduits, and more particularly relates to improved valve control of oxygen concentrator systems and improved operation of such systems.

Valve control systems for cycled switching between multiple fluid processing units such as dual molecular sieve beds for oxygen separation from air have been described for example in U.S. Pat. No. 4,925,464 which is incorporated by reference herein. This patent describes control valve structure employing two valve members which have respectively engaged surfaces which are relatively rotatable to provide valving action and cycled operation of the dual molecular sieve bed processing units. The relative rotation of the valve members is driven in a continuous manner and performs modulated flow switching with simple and reliable cycle frequency.

The present invention provides improved efficiency in the cycled processing of such systems with an improved valve structure providing additional process flow functions.

SUMMARY OF THE INVENTION

In accordance with the present invention, a valve assembly and processing system are provided in which the valve assembly enables cycled fluid flow switching and communication between a plurality of flow conduits. The valve assembly includes two valve members which have respective engaged surfaces relatively rotatable to provide the valving action. A first valve member includes at least three through apertures for respective communication with the flow conduits, and the second valve member includes a flow passage for selectively interconnecting a plurality of the apertures and enables selective interconnection of the three apertures for fluid flow among the three apertures and the respective conduits. Continuous relative rotation of the valve members enables rotationally cycled interconnection and fluid flow through the interconnected apertures.

In one embodied processing system, paired fluid processing vessels are in separate, respective fluid flow communication with two of the three apertures in order to enable balance of pressure within said processing vessels with fluid flow therebetween through said selected interconnection of the three apertures. Fluid can be processed through the vessels in a cycled manner in which a fluid source is connected to one of the three valve apertures and the two processing vessels are connected to second and third of the apertures. Flow passage in the second valve member provides for the alternative pressurizing of the processing vessels followed by the interconnection of the respective valve apertures connected to the processing vessels in order to enable pressure balancing flow between the two processing vessels. The system can be employed, for example, to provide switching of air intake between dual air separation vessels which are operated in a cycled manner to provide concentrated oxygen product. The valve assembly then allows periodic communication between the two processing vessels so that the oxygen-rich product from one of the vessels is used to pre-charge the other processing vessel.

In a preferred embodiment of the air separation processing system, a recycled portion of the oxygen-rich product stream is blended with air to form a feed mixture to the oxygen separation processing vessels which thereby increases the oxygen concentration in the product stream. The waste gas from the processing vessels is discharged to exhaust through a pressure transfer unit which transfers the pressure of the waste gas stream to the feed mixture stream which is compressed for intake to the processing vessels and thus increases the operating efficiencies of both the air separation process and the waste gas purging process.

BRIEF DESCRIPTION OF THE DRAWINGS

FIG. 1 is an elevation view of one embodiment of a valve structure and instrument for separation of oxygen from air, and in accordance with the present invention;

FIG. 2 is a schematic diagram showing the arrangement of fluid flow through a processing system including a valve structure and instrument as shown in FIG. 1;

FIG. 3 is a plan view of one valve disk of the valve structure in FIGS. 1 and 2;

FIG. 4 is a plan view of the second valve disk as shown in FIGS. 1 and 2;

FIG. 5 is a side view of the valve disk shown in FIG. 4;

FIGS. 8-18 are detailed plan views of the relative rotation of the valve disks of FIGS. 3 and 4 through the sequential alignments during one-half revolution indicated in FIG. 6, and beginning with FIG. 9 correspond to diagrammatic interconnections in FIGS. 7A-7H.

DESCRIPTION OF THE ILLUSTRATED EMBODIMENT

Figure 6:
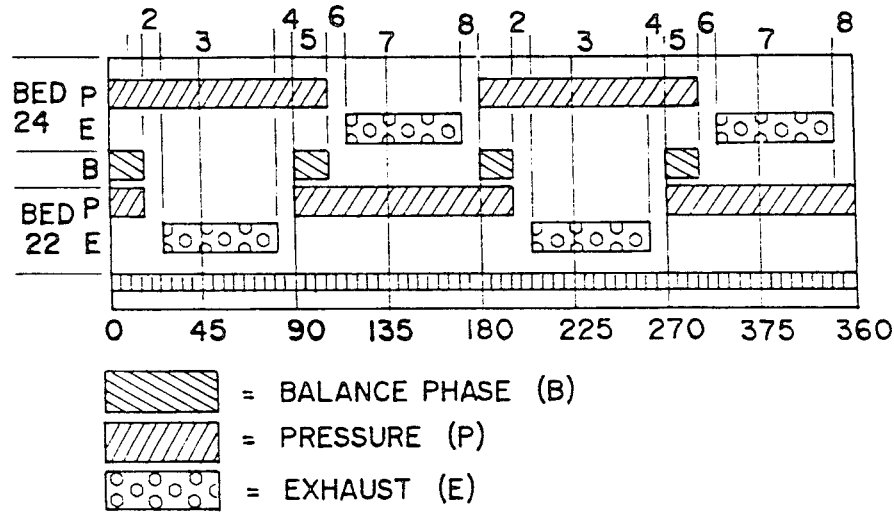
FIG. 6 is a timing diagram indicating the pressure conditions in the processing vessels of the system of FIG. 2 during the progressive relative rotation of the valve disks through one full revolution.

Referring to FIG. 1, an embodiment of the valve assembly in accordance with the present invention generally designated by reference character 10 is shown installed on an instrument for separation of oxygen from air generally designated by reference character 12. The valve assembly 10 includes a stationary valve disk 14 shown in FIG. 3 which engages a rotating valve disk 16 shown in FIG. 4 which is rotationally driven by a synchronous motor 18 having an internal gear reduction system, as more fully described hereinafter.

The valve disks 14 and 16 are housed within an end cap generally designated by reference character 11 which is secured on the upper end of a vertically oriented vessel housing 20. The housing 20 encloses a pair of vertically oriented cavities 22 and 24 which are each filled with a bed of conventional, zeolitic molecular sieve particles which adsorb nitrogen, carbon dioxide and water vapor from pressurized air so that the separated oxygen is discharged alternatively from the beds and is accumulated in product tank 64 as shown in the flow diagram illustrated in FIG. 2.

In the arrangement of the illustrated instrument 12, intake air is filtered through a filter 28 and then optionally passed through pressure transfer unit 30 as more fully described hereinafter. The filtered air (which is typically cooled) flows through a delivery line 32 or 32' and is then optionally mixed at junction 34 with a recycle stream of oxygen-rich product from line 36. The mixture of intake air and recycled oxygen-rich product is then compressed by compressor 38 from which the mixture is discharged through line 40 to the valve assembly 10. At the valve assembly 10, the air mixture flows into the air aperture 42 formed in the stationary valve disk 14 as diagrammatically illustrated in FIG. 2.

From the aperture 42 the air mixture is directed to one or both of the two sieve bed cavities 22 and 24 by either alternative interconnection of the aperture 42 with one of the respective apertures 44 or 46, or by simultaneous interconnection to both of apertures 44 and 46; the alternative interconnection of the air aperture 42 with either aperture 44 or 46 is provided by one of a pair of blind, arcuate slots 50 and 52 formed in the rotating valve disk 16. The arcuate slots 50 and 52 are entirely symmetrical and each slot has arcuate dimension sufficient to extend across the aperture 42 so that the respective enlarged slot ends 51, 51 or 53, 53 can selectively open into the opposing apertures 44 and 46 as best shown in FIG. (10) when the valve disks 14 and 16 are in the operative engagement as shown in FIG. 1 and further described hereinafter. As best shown in FIG. 5, the rotating valve disk 16 is axially dimensioned with sufficient thickness to enable the two blind slots 50 and 52 to open only through the lower surface 16a which engages the upper surface of the stationary valve disk 14 in the operative engagement shown in FIG. 1.

Figure 7A:
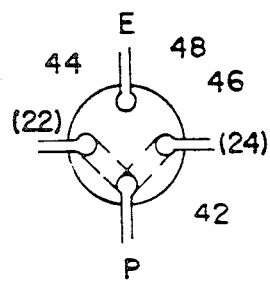
FIGS. 7A-7H are schematic diagrams indicating the valve aperture connections by multiple rotational alignments of the two valve disks in sequenced positions corresponding to the angular timing indicated in FIG. 6.
Figure 7B:
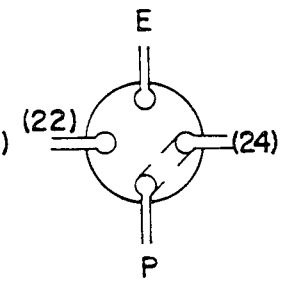
Figure 7C:
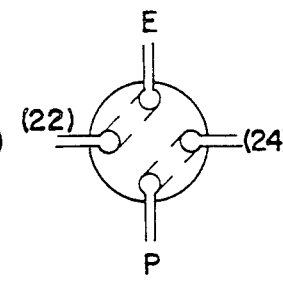
Figure 7D:
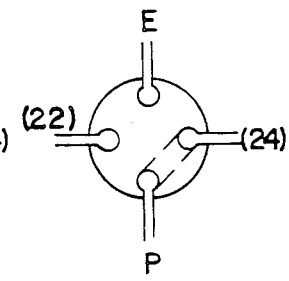
Figure 7E:
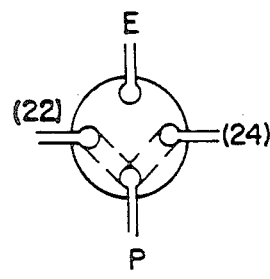
Figure 7F:
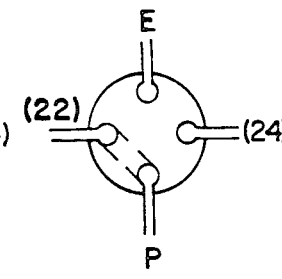
Figure 7G:
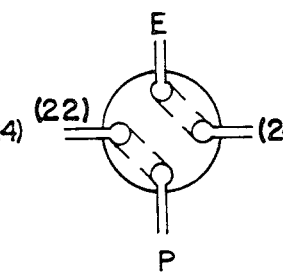
Figure 7H:
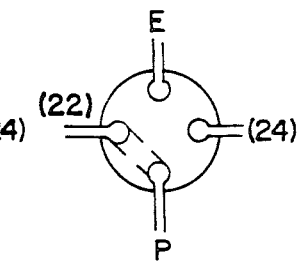
Figure 16:
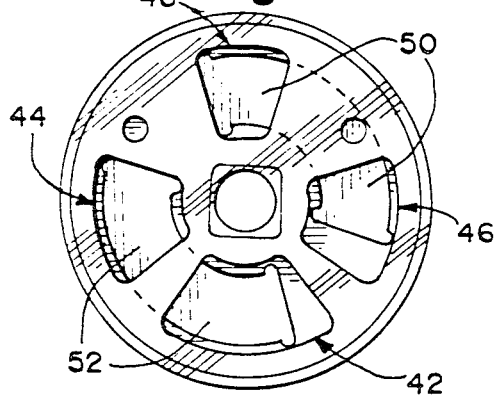
Figure 17:
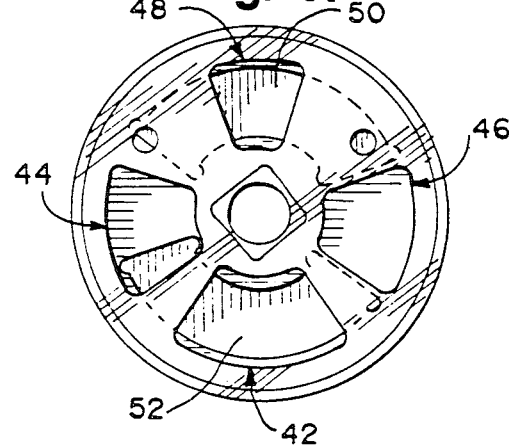
Figure 18:
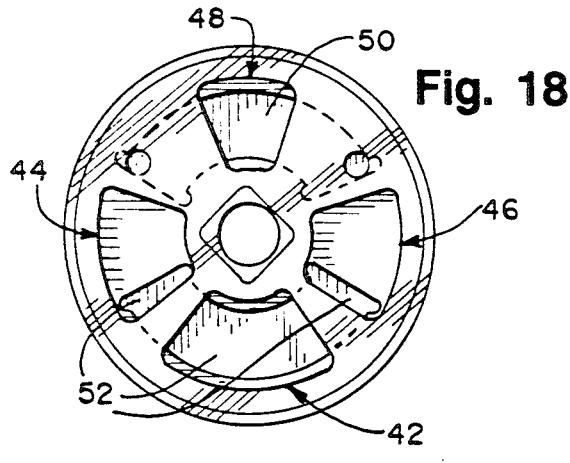

In the relative rotational positions of the valve disks 14 and 16 which channel the primary air separation processing as shown in diagrammatic FIGS. 7C and 7G, as well as the detailed illustrations in FIGS. 8, 12 and 16, the rotational position of the disk 16 superimposes alignment of the slot 52 to interconnect the air aperture 42 with only one of the adjacent apertures 44 or 46 in order to communicate the air with only one of the alternative sieve beds 22 or 24 for oxygen separation in the air connected bed; at the same time, the arcuate slot 50 alternatively interconnects only the other of the adjacent apertures 44 or 46 and the respective bed 22 or 24, with the fourth aperture 48 which leads to the exhaust or waste gas discharge 54 (or optionally directly to discharge 54') through the pressure transfer unit 30 and the lines 56 and 58. FIGS. 8-18 illustrate counterclockwise rotation of the valve disk 16 and slots 50,52 as viewed from the bottom of the stationary valve disk 14. The apertures and slots are arranged so that rotation of the valve disk 16 by 180° accordingly reverses the position of the slots 50 and 52 although the interconnection of air aperture 42 with aperture 46 and sieve bed 24 as well as the interconnection of exhaust aperture 48 with aperture 44 and sieve bed 22 are again functionally the same as further illustrated by the angular positions at 45° and 225° represented in the timing diagram of sieve bed connections in FIG. 6. In the illustrated embodiment of the valve assembly 10, the air mixture from line 40 and the exhaust or waste gas to line 56 are connected to respective diametrically opposed valve disk apertures 42 and 48. The locating aperture 47 and two small securing holes 49 receive anchoring pins (not shown) to hold the disk 14 stationary. Modification in the number and arrangement of the apertures and slots can be employed for suitably configured processing systems.

Referring again to FIG. 2, the discharge conduits 60 and 62 from the respective bed vessels 22 and 24 both lead to the oxygen product tank 64 with respective check valves 66 and 68 so that the bed vessels 22 and 24 can alternatively deliver separated oxygen to the product tank 64 which is pressure regulated at 65. In addition, a portion of the oxygen-rich product is optionally recycled through the branch line 36 and control orifice 37 to the juncture 34 as aforementioned, in order to elevate the oxygen concentration of the feed mixture compressed and delivered to the sieve beds. The product recycle results in consequent higher concentration of oxygen in the oxygen-rich product of the separation process performed in both of the sieve beds 22 and 24.

The discharge conduits 60 and 62 can be installed as part of a bottom end cap 13 as shown in FIG. 1. In addition, discharge conduits 60 and 62 are connected by a bridge circuit 70 with a purge orifice 72 in order to enable a portion of the product oxygen stream from either of the bed vessels 22 and 24 to provide a lower pressure back flow of oxygen through the respective discharge conduit to regenerate the sieve bed in the other vessel. The back flow of oxygen-rich product lowers the pressure in the regenerating bed and vessel which causes the molecular sieve material to release the adsorbed nitrogen, carbon dioxide, and water vapor which are then purged through the respective valve disk apertures 44 and 46 alternatively interconnected to the exhaust aperture 48 by one of the slots 50, 52 during each successive 90° rotation of valve disk 16 as represented at angular positions at 45° and 135° of the timing diagram in FIG. 6 and schematically illustrated in FIGS. 7C and 7G, as well as, detailed illustrations in FIGS. 12 and 16.

Figure 14:
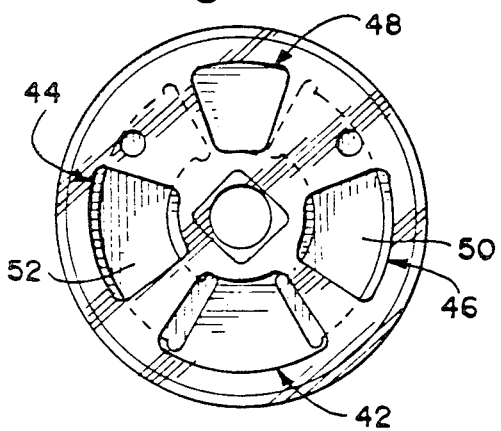
Figure 15:
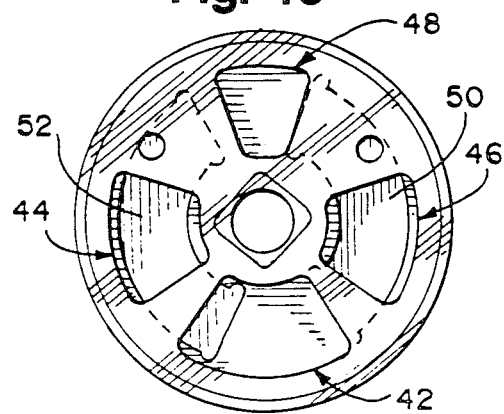

In addition to the alternative charging of the feed air mixture and backflow regeneration of the sieve beds in the two vessels 22 and 24, the valve 10 also enables a rotationally selective pressure balancing phase during which the peak pressure within the charged vessel is diverted or allowed to reverse flow into the fully regenerated bed of the other vessel immediately before the primary charging of the regenerated vessel by the compressor. In the illustrated embodiment, this interim, balance phase flow, occurs four times during each full revolution of the rotating valve 16 as represented in the timing diagram of FIG. 6 at angles of approximately 15°, 105°, 195°, and 285°, and is diagrammatically represented in FIGS. 7A and 7E. The balance phase flow is achieved in two different relative rotational configurations of the disks 14 and 16 during a single revolution of disk 16. In the first balance phase configuration as illustrated in FIG. 10, the flow passage slot 50 extends across the aperture 42 so that the enlarged slot ends 51, 51 open into and provide passage from the opposing apertures 44 and 46 to allow the pressure balancing flow either from sieve bed 22 to sieve bed 24 (as represented at the angle of 105° in FIG. 6); in contrast, the balance phase flow from vessel 24 to vessel 22 as represented by the angle of approximately 15° in FIG. 6 is achieved by the second balance phase rotational configuration illustrated in FIG. 14 in which the air mixture aperture 42 is separately interconnected with both of the opposing apertures 44 and 46 by the respective slots 52 and 50. Thus, a balance phase is achieved each cycled rotational interval of 90° but the interconnection of the apertures 42, 44 and 46 is made at alternate 90° intervals by only one of the slots 50 or 52 as shown in FIG. 10, and then by both of slots 50, 52 as shown in FIG. 14. The duration of the balance phase is increased by the somewhat longer arcuate dimension of the aperture 42 in comparison to the equal arcuate dimensions of apertures 44 and 46 as particularly emphasized in the balance phase configuration illustrated in FIG. 14.

The cycled balance phase operation improves the efficiency of the oxygen concentration process because the product gas discharged from the processing sieve bed is normally richer in oxygen than the feed air mixture from the compressor, and therefore the freshly regenerated sieve bed is pre-charged in the balance phase with a higher initial concentration of oxygen in the initial feed air mixture in comparison to the air mixture feed from the compressor alone after the termination of the balance phase pre-charge. In addition, the efficiency is improved because approximately half of the pressure of the oxygen-rich gas from the first, processing sieve bed is salvaged by the balance phase pre-charged diversion to the regenerated second sieve bed resulting in a reduction in the pressure demand on the compressor during the balance phase, and the pre-charged gas is recovered rather than lost in exhaust to the atmosphere. Furthermore, the pre-charging in the balance phase enables optimization of the overall concentrator system by allowing reduction of the processing cycle time and increase in the processing cycle frequency.

As best shown in the timing diagram of FIG. 6, at the beginning and end of each balance phase there is a short transition interval as represented for example, between approximately 15°-30°, during which the compressor feeds the regenerated sieve bed vessel (24) both before, at approximately 15°-30°, and after, approximately 75°-90°, the valve 10 has connected the exhausting sieve bed vessel (22) to the exhaust aperture 48. This short transition interval eliminates "dead-heading" of the compressor operation and is further illustrated in the schematic diagram of FIG. 7B corresponding to the valve disk configuration shown in FIG. 11.

Referring again to FIG. 2, the optional pressure transfer unit 30 functions to transfer pressure from the exhaust side of the sieve beds, from the valve aperture 48 and exhaust line 56, to the fluid on the intake side of the compressor 38 illustrated at line 32 thus resulting in lowering of the waste gas exhaust pressure and raising of the compressor intake pressure. The pressure transfer unit 30 can be, for example, a conventional bladder accumulator with commercially available from Greer Company, in which the waste gas stream is delivered to the interior of the bladder which expands and contracts, under regulation by valve 59 and return spring 61, with the cyclic delivery of exhaust gas from either of the sieve beds; the internal pressure within the bladder is then transmitted by the bladder diaphragm 31 to the one-way flow intake air stream controlled by check valve 29, which feeds the compressor. The lowering of the exhaust pressure thus achieves an increase in the differential operating pressure across the regenerating or purging sieve bed and thus increases the overall efficiency of the entire instrument 10. The pressure transfer unit 30 can alternatively employ a piston chamber to achieve the cyclic pressure transfer which is controlled by check valves 57 in both the lines 56 and 58 on the exhaust side of the unit 30 to allow the unit 30 to function as a cyclic accumulator of the pressurized exhaust gas which flows in the described interrupted manner.

Referring again to FIGS. 3 and 4, the valve disks 14 and 16 can be cast or molded from materials which can be ground to highly polished finish and flatness so that the engaged disk surfaces are sufficiently conforming for fluid-tight seal maintained between the surfaces even while they are relatively rotated during valve operation. Suitable materials may include both ceramic and polymeric materials. In addition, the stationary valve disk 14, can be replaced by an apertured wall of the valve housing for simplified fabrication and assembly of the valve structure. The fluid-tight seal between the engaged valve disk surfaces is preferably maintained by compressive force of spring washer and thrust bearing members (not shown) as more fully described in the aforementioned U.S. Pat. No. 4,925,464. The synchronous motor 18 continually rotates the drive aperture 16c and valve disk 16 at a slow speed generally governed by the appropriate length of time required for saturation of one of the molecular sieve beds 22 and 24 with the adsorbed nitrogen, carbon dioxide and water vapor from the input air.

While particular embodiments of the present invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

The invention is claimed as follows:

1. A method for balancing the pressure between two fluid processing vessels in a cycled operating system controlled by a valve structure having two relatively rotatable valve members including a first valve member having at least first, second and third through apertures in respective flow communication with (1) a source of pressurized fluid, and separately with (2 and 3) each of said processing vessels, and a second valve member including flow passage means for selectively interconnecting a plurality of said apertures to enable fluid flow therebetween, said method comprising the steps of:
  (a) interconnecting said first aperture and only one of said second and third apertures through said flow passage means and flowing said pressurized fluid from said source into said processing vessel in flow communication therewith, and thereafter,
  (b) interconnecting said second and third apertures through said flow passage means; and
  (c) flowing said pressurized fluid from said processing vessel in step (a) through said flow passage means into the other of said processing vessels in order to promote pressure balance therebetween.

2. A method according to claim 1, wherein step (b) comprises interconnecting all three of said apertures through said flow passage means.

3. A method according to claim 2, further comprising flowing said pressurized fluid from said source through said flow passage means into at least one of said processing vessels simultaneously with said flowing in step (c).

4. A method according to claim 1, wherein said first valve member further includes a fourth aperture for selective interconnection to discharge fluid from said processing vessels, said method further comprising isolating said fourth aperture from interconnection with any of said first, second and third apertures during said interconnecting of the second and third apertures in step (b).

5. A method for increasing the concentration of oxygen in the product stream from an air separation process, comprising the steps of:
   a) feeding a feed mixture of air and oxygen to an oxygen concentration processor;
   b) processing said mixture to produce an oxygen-enriched product stream discharged from said processor;
   c) recycling a portion of said discharged oxygen-enriched product stream into mixture with air to form an oxygen-enriched air mixture defining said feed mixture in step (a);
   d) discharging a waste gas stream from step b);
   e) transferring pressure from said waste gas stream to one of:
      1) said air;
      2) said oxygen enriched product stream; or
      3) said feed mixture in order to increase the pressure of said feed mixture in step (a) while reducing the pressure of said waste gas stream.

6. A method according to claim 5, further comprising compressing said feed mixture after step (e) and prior to step (a).

7. A system for transferring fluid flow pressure, comprising:
   a) compressor means for pressurizing fluid, having fluid intake and discharge conduits;
   b) processing means for processing fluid discharged through said discharge conduit from said compressor means;
   c) pressure transfer means for transferring pressure exerted by processed fluid effluent thereto from said processing means to feed fluid flow into said compressor means thereby increasing differential operating pressure across said processing means.

8. A system according to claim 7, wherein said pressure transfer means comprises a diaphragm against which said pressure exerted by said processed fluid effluent is exerted and transmitted to said feed fluid flow intake to said compressor means.

9. A system according to claim 7, further comprising control means for controlling accumulation of said pressure exerted by said processed fluid effluent in said pressure transfer means.

* * * * *